United States Patent [19]
Bilbrey

[11] Patent Number: 5,954,090
[45] Date of Patent: Sep. 21, 1999

[54] FLEXIBLE FLOWER INDICATOR MECHANISM

[75] Inventor: Robert A. Bilbrey, Orinda, Calif.

[73] Assignee: AMOT Controls Corporation, Richmond, Calif.

[21] Appl. No.: 08/949,920

[22] Filed: Oct. 14, 1997

[51] Int. Cl.[6] .................................................. F16K 37/00
[52] U.S. Cl. ............................ 137/557; 251/63.6; 73/744
[58] Field of Search ............................... 137/557, 625.34, 137/625.35; 73/744; 251/25, 63.6

[56] References Cited

U.S. PATENT DOCUMENTS

| | | | |
|---|---|---|---|
| 3,033,220 | 5/1962 | St. Clair | 137/557 |
| 3,411,533 | 11/1968 | Puster | 137/557 |
| 3,618,630 | 11/1971 | Marcaccio | 137/557 |
| 4,074,688 | 2/1978 | Snyder | 251/63.6 |
| 4,121,615 | 10/1978 | Bergeron | 137/555 |
| 4,137,942 | 2/1979 | Hargraves et al. | 137/557 |
| 4,450,866 | 5/1984 | Grimm et al. | 137/625.34 |
| 4,499,846 | 2/1985 | Bergeron et al. | 137/557 |
| 4,756,330 | 7/1988 | Tischer | 137/625.35 |

*Primary Examiner*—A. Michael Chambers
*Assistant Examiner*—Paul Coryea
*Attorney, Agent, or Firm*—Henderson & Sturm

[57] ABSTRACT

An indicator mechanism symbolizing an operating condition of a valve. The indicator includes a body member attached to the valve and having a window opening. A guide is positioned in the body member to be visible through the window opening. A flower is also disposed within the body member and is movable between a first position retracted from and exposing the guide in the window opening, and a second position extending over and obscuring the guide from the window opening. The flower may be moved by a pressurized fluid acting directly or indirectly on the flower or by mechanical contact with another moving component such as a valve spool.

15 Claims, 3 Drawing Sheets

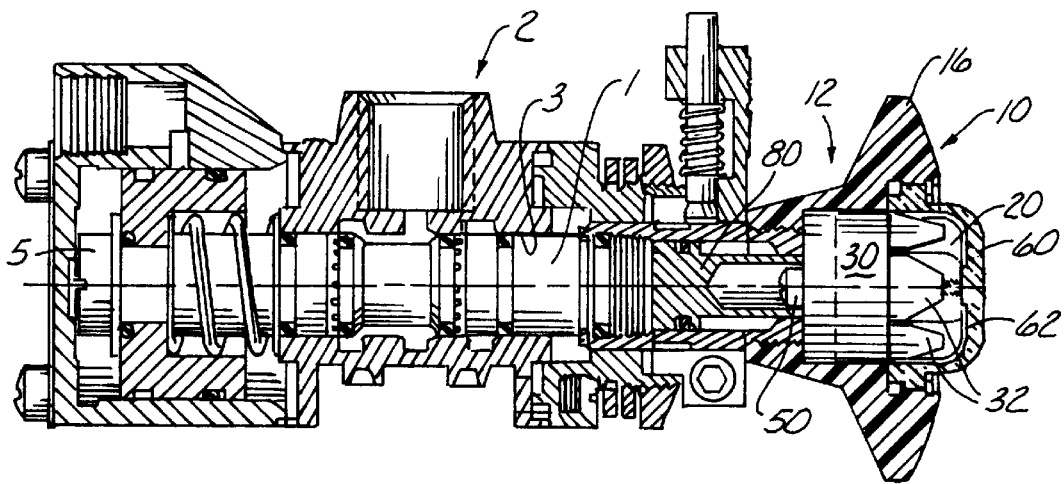
Fig. 1
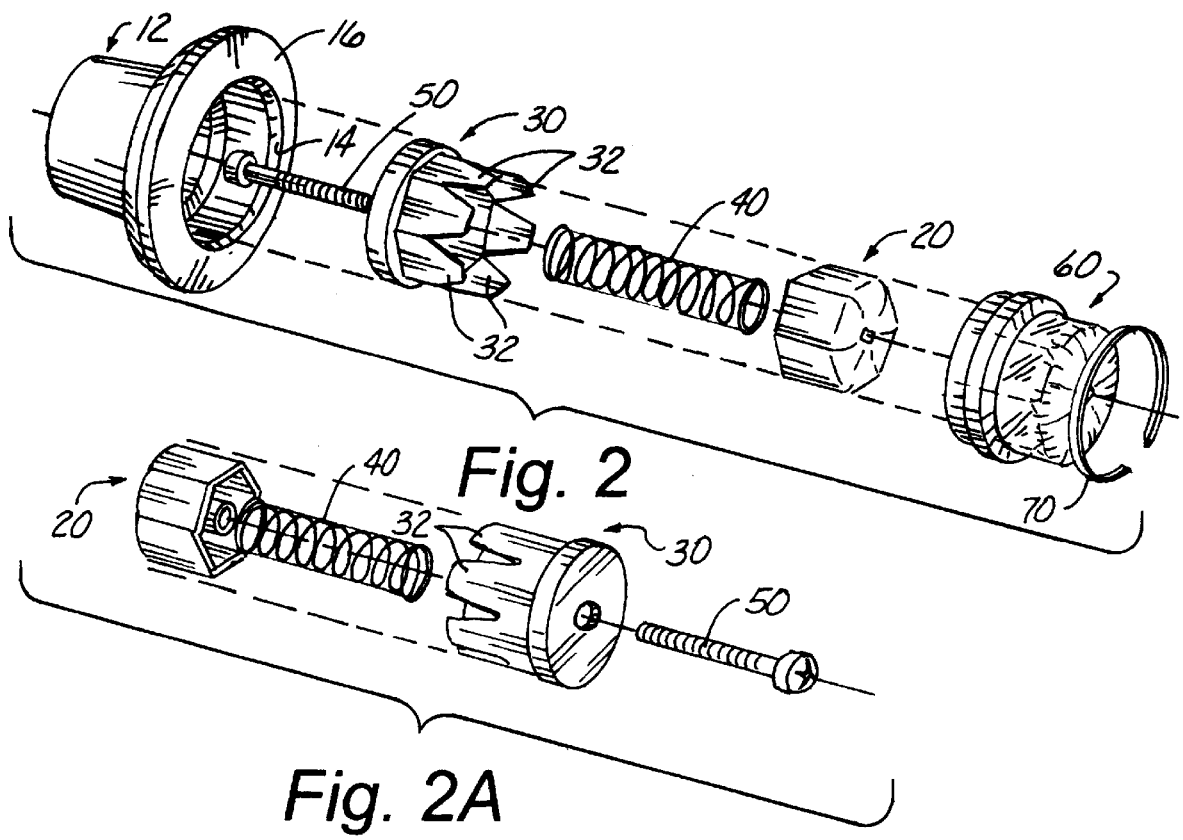
Fig. 2
Fig. 2A

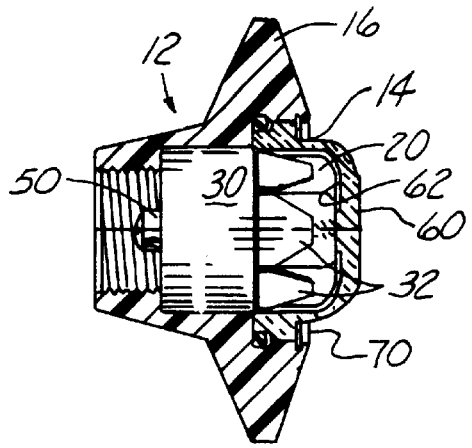
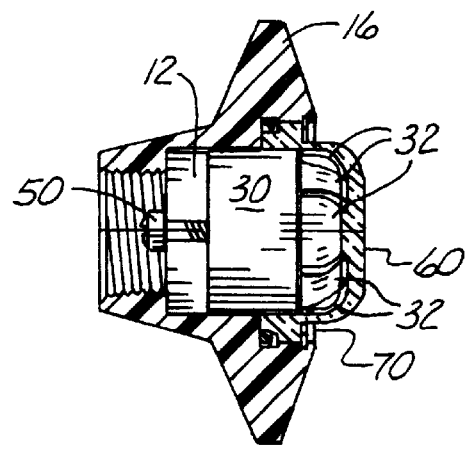
Fig. 3              Fig. 4
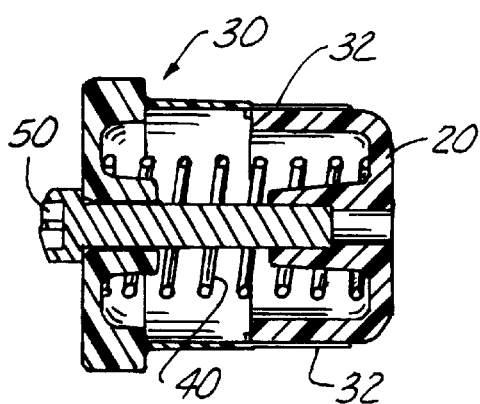
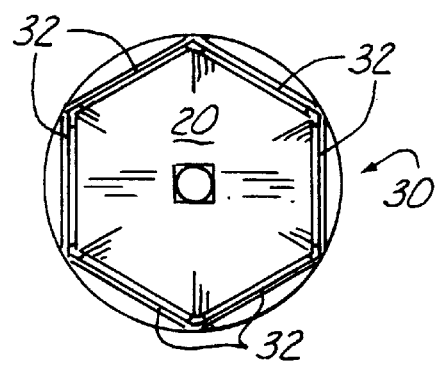
Fig. 5              Fig. 6
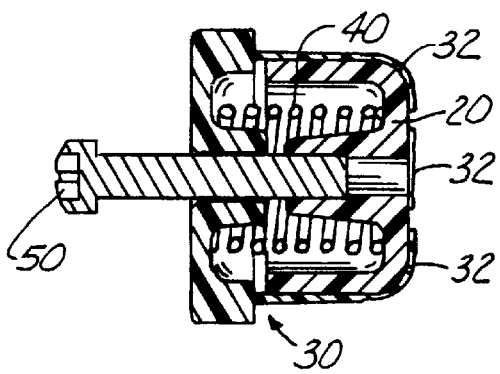
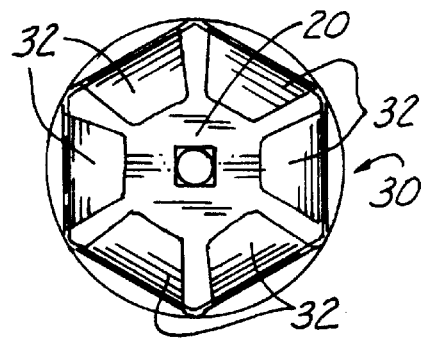
Fig. 7              Fig. 8

FLEXIBLE FLOWER INDICATOR MECHANISM

CROSS-REFERENCE TO RELATED APPLICATIONS

Not Applicable

STATEMENT REGARDING FEDERALLY SPONSORED RESEARCH OR DEVELOPMENT

Not Applicable

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to indicator mechanisms, and more particularly to a indicator for valves to symbolize an operating condition of the valve.

2. Description of the Related Art

Indicator mechanisms are available which show the operating condition of valves; however, presently available indicators are mechanically intensive. Also, known indicators are inefficient in that the viewable area indicating the operating condition is a small surface not easily viewable, particularly from positions to the side of the viewing window.

Those concerned with these and other problems recognize the need for an improved indicator mechanism.

BRIEF SUMMARY OF THE INVENTION

The present invention discloses an indicator mechanism symbolizing an operating condition of a valve. The indicator includes a body member attached to the valve and having a window opening. A guide is positioned in the body member to be visible through the window opening. A flower is also disposed within the body member and is movable between a first position retracted from and exposing the guide in the window opening, and a second position extending over and obscuring the guide from the window opening. The flower may be moved by a pressurized fluid acting directly or indirectly on the flower or by mechanical contact with another moving component such as a valve spool.

Therefore, an object of the present invention is the provision of an improved indicator mechanism for a valve.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 1 is a sectional view of a spool valve having a hollow spool utilizing the indicator mechanism of the present invention;

FIG. 2 is an exploded perspective view of the indicator mechanism in a pull knob body member;

FIG. 2A is an exploded perspective view of the flower and guide from the opposite side of that illustrated in FIG. 2;

FIG. 3 is a partial sectional view thereof showing the flower in a position retracted from and exposing the guide in the window opening;

FIG. 4 is a partial sectional view thereof showing the flower in a position extended over and obscuring the guide in the window opening;

FIG. 5 is a sectional view of the indicator mechanism showing the flower biased to the retracted position;

FIG. 6 is a front elevational view thereof;

FIG. 7 is a sectional view of the indicator mechanism showing the flower moved to the extended position;

FIG. 8 is a front elevational view thereof; and

DETAILED DESCRIPTION OF THE INVENTION

Figure 9:
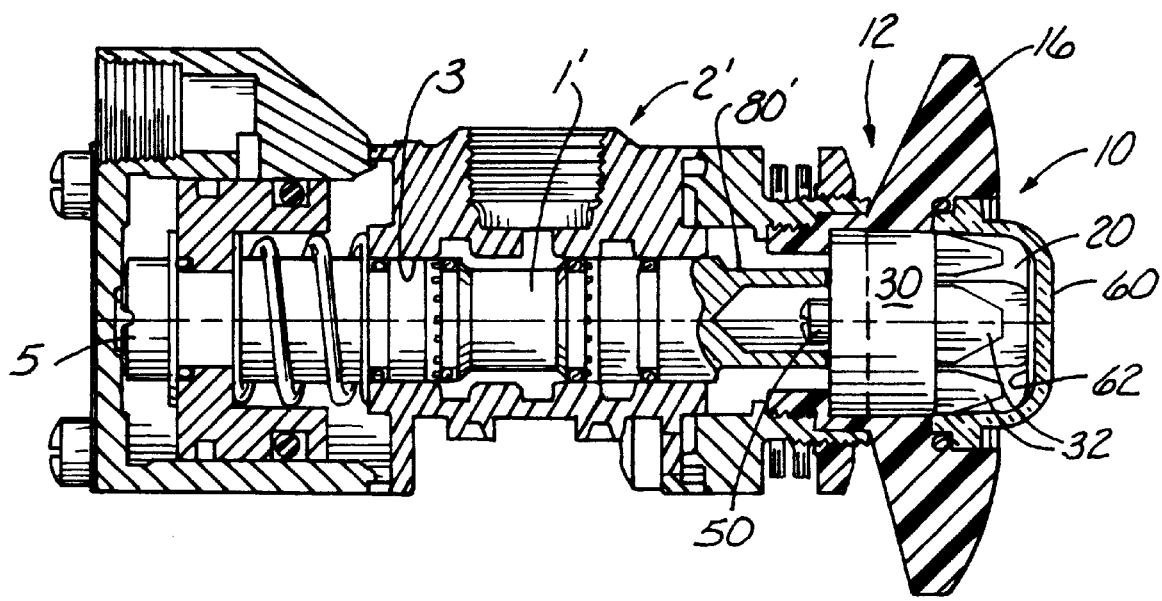
FIG. 9 Is a sectional view of a spool valve having a solid spool utilizing the indicator mechanism of the present invention.

Referring now to the drawings, wherein like reference numerals designate identical or corresponding parts throughout the several views, FIG. 1 shows the indicator mechanism (10) of the present invention disposed at one end of the spool (1) of a high pressure spool valve (2). The spool (1) is movable within the cylinder (3) to allow fluid flow through the desired combination of ports. The spool valve (2) embodiment illustrated in FIG. 1 includes a hollow spool (1). The spool valve (2') embodiment illustrated in FIG. 9 includes a solid spool (1').

As best shown in FIGS. 1, 2, and 2A, the indicator mechanism (10) includes a body member (12) threadably attached to one end of the spool valve (2). The body member (12) has a window opening (14) and a flanged end (16) that functions as a grip of the pull knob embodiment shown in FIG. 1. It is understood that other configurations of the body member (12) could be employed with the invention.

The body member (12) receives an attached guide (20) and flower (30) assembled as illustrated in FIG. 2. A biasing spring (40) is interposed between the guide (20) and flower (30) and is secured in position by a fastener (50). A lens (60) overlies the guide (20) and is secured to the body member (12) by snap ring (70). As shown in FIG. 1, an indicator piston (80) is disposed within the valve (2) and is operably associated with the movable flower (30). Since the FIG. 1 embodiment includes a hollow spool (1), when pilot pressure is applied, where is it is applied (through the port, etc.), passes through the hollow spool nut (5) into the spool (1) and applies pressure to move the indicator piston (80), and thus move the flower (30) to the right to extend over the guide (20). The spring (40) is tailored to collapse at the same pilot pressure that causes the movement of the spool (1). In the FIG. 9 embodiment using a solid spool (1'), the indicator piston (80') is integrally formed at one end of the solid spool (1'), and is moved by the pilot pressure acting on the opposite end of the solid spool (1'). Also, it is to be understood that pilot pressure or other operating pressure could be used to directly move the flower (30), where the flower (30) itself would act as the indicator piston (80).

As shown in FIGS. 3–8, the guide (20) is disposed to extend out of the window opening (14) so that it is visible from the side as well as from the front. The guide surface may be of a red color, or have other distinguishing characteristics. The flower (30) includes a number of flexible petal portions (32). The flower (30) is movable with respect to the guide (20) between a first retracted position where the guide (20) is exposed in the window opening (14) (FIGS. 3, 5 and 6), and a second extended position where the guide (20) is obscured from the window opening (14) (FIGS. 4, 7 and 8). The flower surface may be of a green color, or have other distinguishing characteristics that contrast with the guide surface. As shown in FIG. 8, the petals (32) do not completely cover the guide (20) so that the contrast in colors or textures can be seen even where the observer is color blind.

The lens (60) is disposed over the window opening (14) and is positioned in close proximity to the guide (20). The space (62) formed between the lens (60) and the guide (20) is disposed to receive the petal portions (32) of the flower (30) when the flower (30) is moved to the second position. The lens (60) forms a generally hemispherical contoured extension and the guide (20) is contoured to conform to the lens (60). This feature allows the guide (20) and/or the petal portions (32) to be clearly seen from the side as well as from the front.

The indicator mechanism (10) of the present invention is uncomplicated in design, is reliable, is durable, and possesses a large color spot with a large field of view so that color indications will be apparent even when viewed from oblique angles.

In the base or reset condition, the color of the guide— typically red—is displayed through the lens (60). When the indicator piston (80) moves from left to right (FIG. 1) under pneumatic action, the flower (30) is moved so that the flexible petals (32) advance and extend into the space (62) between the guide (20) and the lens (60). The petals (32)— typically green—cover the guide (20) and converge at the center of the lens (60) (FIG. 8). This action effectively changes the color of the indicator mechanism from red to green to symbolize the operating condition of the valve (2). The indicator mechanism (10) is biased by spring (40) so that when the pneumatic pressure behind the indicator piston (80) is vented, the piston (80) moves from right to left (FIG. 1) returning to its original position, and again exposing the red color of the guide (20).

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An indicator mechanism for valves, comprising:

a body member attached to a valve and having a window opening;

a guide disposed within the body member and being visible through the window opening;

an indicator portion including a flower disposed within the body member and being movable between a first position retracted from and exposing the guide in the window opening, and a second position extending over and obscuring the guide from the window opening;

a lens being disposed over the window opening and being positioned in close proximity to the guide forming a space therebetween, the space being disposed to receive a petal portion of the flower when the flower is moved to the second position, wherein the petal portion of the flower is flexible, and wherein the guide is contoured to conform to the lens; and means for moving the flower between the first and second positions.

2. The indicator of claim 1 wherein the body member is attached to a spool valve having a hollow spool, and the moving means is a predetermined pressure of a fluid transmitted through the hollow spool to the movable flower.

3. The indicator of claim 2 wherein an indicator piston is disposed within the valve in communication with the fluid, the indicator piston being operably associated with the movable flower.

4. The indicator of claim 1 wherein the body member is attached to a spool valve having a solid spool, and the moving means is a predetermined pressure of a fluid transmitted to one end of the solid spool to move the solid spool toward the movable flower.

5. The indicator of claim 4 wherein an indicator piston is formed at another end of the solid spool, the indicator piston being operably associated with the movable flower.

6. The indicator of claim 1 further including biasing means for returning the flower from the second position to the first position.

7. The indicator of claim 6 wherein the biasing means is a spring interposed between the guide and the flower.

8. The indicator of claim 1 wherein the lens extends out from the window opening of the body member to form a generally hemispherical contoured extension.

9. The indicator of claim 1 wherein the flower includes a plurality of flexible petal portions which are disposed in the contoured space between the lens and the guide when the flower is moved to the second position.

10. The indicator of claim 9 wherein the flexible petal portions partially obscure the guide from the window opening when the flower is moved to the second position.

11. The indicator of claim 1 wherein the guide includes a surface with a first distinguishing characteristic, and the flower includes a surface with a second contrasting distinguishing characteristic.

12. The indicator of claim 11 wherein the guide is of one color and the flower is of another contrasting color.

13. The indicator of claim 11 wherein text or symbols are printed or hot stamped on the guide, whereby additional information is visible through the window opening.

14. The indicator of claim 11 wherein text or symbols are printed or hot stamped on the flower petals, whereby additional information is visible through the window opening.

15. The indicator of claim 13 wherein text or symbols are printed or hot stamped on the flower petals, whereby additional information is visible through the window opening.

* * * * *